Sept. 20, 1966 D. A. FLUEGEL ETAL 3,273,576
MEASUREMENT AND CONTROL SYSTEM
Filed Dec. 31, 1962 2 Sheets-Sheet 1

INVENTORS
D.A. FLUEGEL
L.E. KUNTZ
BY Young & Quigg
ATTORNEYS

INVENTORS
D. A. FLUEGEL
L. E. KUNTZ
BY Young & Quigg
ATTORNEYS

United States Patent Office 3,273,576
Patented Sept. 20, 1966

3,273,576
MEASUREMENT AND CONTROL SYSTEM
Dale A. Fluegel and Louis E. Kuntz, Bartlesville, Okla., assignors to Phillips Petroleum Company, a corporation of Delaware
Filed Dec. 31, 1962, Ser. No. 248,381
6 Claims. (Cl. 137—2)

This invention relates to measurement and control of the amount of B.S. & W. (basic sediment and water) in oil. In another aspect it relates to control equipment which responds to input signals of preselected magnitudes.

In the petroleum industry it is common practice to gather oil from a plurality of producing wells at a single location adjacent a pipeline. The oil is treated at this location to remove basic sediment and water, metered and transferred into the pipeline. Automatic custody transfer systems are presently being developed to carry out these operations with a minimum amount of supervision. In a gathering and transfer system of this type it is important that the B.S. & W. concentration in the oil delivered to the pipeline be maintained at less than a predetermined amount. The pipeline owner generally will not accept crude oil having a B.S. & W. content greater than a predetermined amount because of difficulties which may result from the sediment and water settling out in storage tanks. Furthermore, the refiner who purchases the oil from the pipeline generally will not accept oil having B.S. & W. contents greater than a predetermined amount. Since one of the factors which affects the price of the oil is the B.S. & W. content, it is important to have a measurement of the amount of B.S. & W. in the delivered oil.

The amount of B.S. & W. present in crude oil can be determined by measuring the dielectric constant of the oil. This can be accomplished, for example, by positioning a capacitor so that the oil to be measured forms the dielectric thereof. The resulting capacity can be measured to provide a signal which is representative of the B.S. & W. content of the oil. A bridge network normally is employed so that an output voltage is provided which has an amplitude representative of the B.S. & W. content of the oil. Control equipment can be actuated in response to this signal to control the B.S. & W. content of the oil. For example, oil can be recirculated through a treater if the B.S. & W. content exceeds a preselected value, and delivery of the oil to a pipeline can be terminated until the B.S. & W. content is reduced to an acceptable level.

It is important that the control equipment actuated by the detecting apparatus respond immediately to output signals representative of excessive amounts of B.S. & W. In accordance with the present invention, control mechanism is provided which utilizes a trigger circuit in such a manner that an output control signal is established which responds immediately to excessive quantities of B.S. & W. The control circuit can be adjusted to accommodate different levels of B.S. & W. In addition, a procedure is provided to permit a specified minimum amount of B.S. & W. to remain in the final treated oil. If the B.S. & W. content of the untreated oil is within accepted limits, it is not necessary to treat the oil to reduce this content.

Accordingly, it is an object of this invention to provide apparatus for measuring and controlling the amount of B.S. & W. in oil.

Another object is to provide control apparatus which responds rapidly to the fluctuating input signals.

A further object is to provide a method of maintaining the B.S. & W. content of oil within preselected limits.

Other objects, advantages and features of the invention should become apparent from the following detailed description, taken in conjunction with the accompanying drawing in which.

Figure 1:
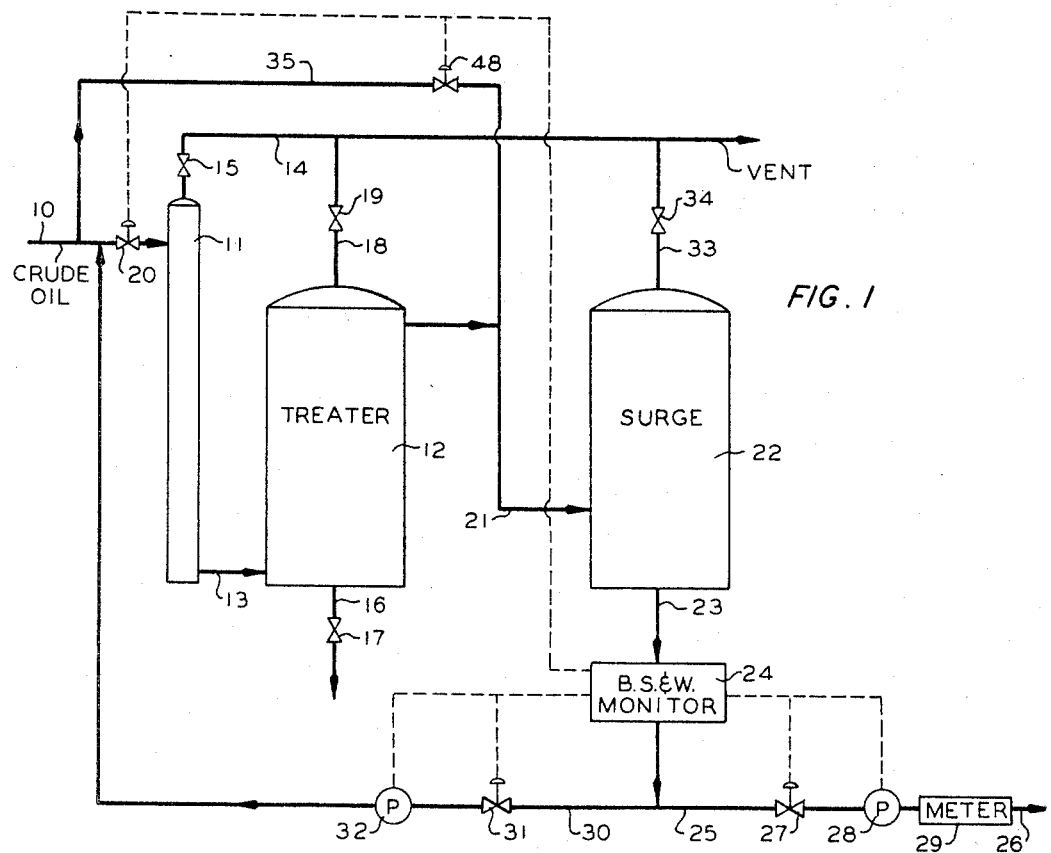
FIGURE 1 is a schematic representation of an oil treating and measuring unit having the monitoring and measuring system of this invention incorporated therein.

Referring now to the drawing in detail and to FIGURE 1 in particular, there is shown a system for measuring, treating and transmitting crude oil to a pipeline. The crude oil is delivered through an inlet conduit 10 which communicates with a vertical column 11. A control valve 20 is disposed in conduit 10. The lower region of column 11 communicates with a treater tank 12 through a conduit 13. Gases entrained in the crude oil are liberated, at least partially, in column 11 and are removed through a vent conduit 14 which has a valve 15 therein. Any B.S. & W. present in the crude oil tends to settle to the bottom of treater 12 and is removed through a conduit 16 which has a valve 17 therein. Treater 12 can be provided with a heating unit, not shown, to facilitate removal of B.S. & W. from the oil. Gases evolved from the oil in treater 12 are removed through a vent conduit 18 which has a valve 19 therein. The treated oil is removed from tank 12 through a conduit 21 which communicates with a surge tank 22. Any gases evolved from the oil in surge tank 22 are removed through a vent conduit 33 which has a valve 34 therein.

The oil in tank 22 is removed through a conduit 23 which has a B.S. & W. monitor 24 therein. Conduit 23 communicates with a conduit 25 which communicates with a pipeline 26 which forms a receptacle for the treated oil. A control valve 27, a pump 28 and an oil meter 29 are disposed in conduit 25. Conduit 23 also communicates with a conduit 30 which communicates with oil inlet conduit 10. A control valve 31 and a pump 32 are disposed in conduit 30. As long as the B.S. & W. content of the oil removed from tank 22 is less than a predetermined value, valve 27 is open and pump 28 is energized to deliver oil to pipeline 26. Valve 31 is closed and pump 32 is deenergized at this time. If the B.S. & W. content of the oil should become excessive, valve 31 is opened, valve 27 is closed, pump 32 is energized and pump 28 is deenergized to terminate the flow of oil to pipeline 26 and to recirculate oil from surge tank 22 through treater 12.

A conduit 35, which has a control valve 48 therein, extends between inlet conduit 10 and conduit 21. Control valves 20 and 48 are actuated by monitor 24. In normal operation, valve 20 remains open and valve 48 is closed so that the oil flows through column 11 and treater 12 to surge tank 22. In the event the measured B.S. & W. content of the treated oil in conduit 23 falls below a second preselected value, it is no longer necessary to treat the crude oil introduced into the system. At this time, monitor 24 provides a second output signal which closes valve 20 and opens valve 48. The crude oil then bypasses the treating system and is introduced directly into surge tank 22. The flow of oil continues in this manner as long as the measured B.S. & W. content does not exceed the upper maximum value.

Figure 2:
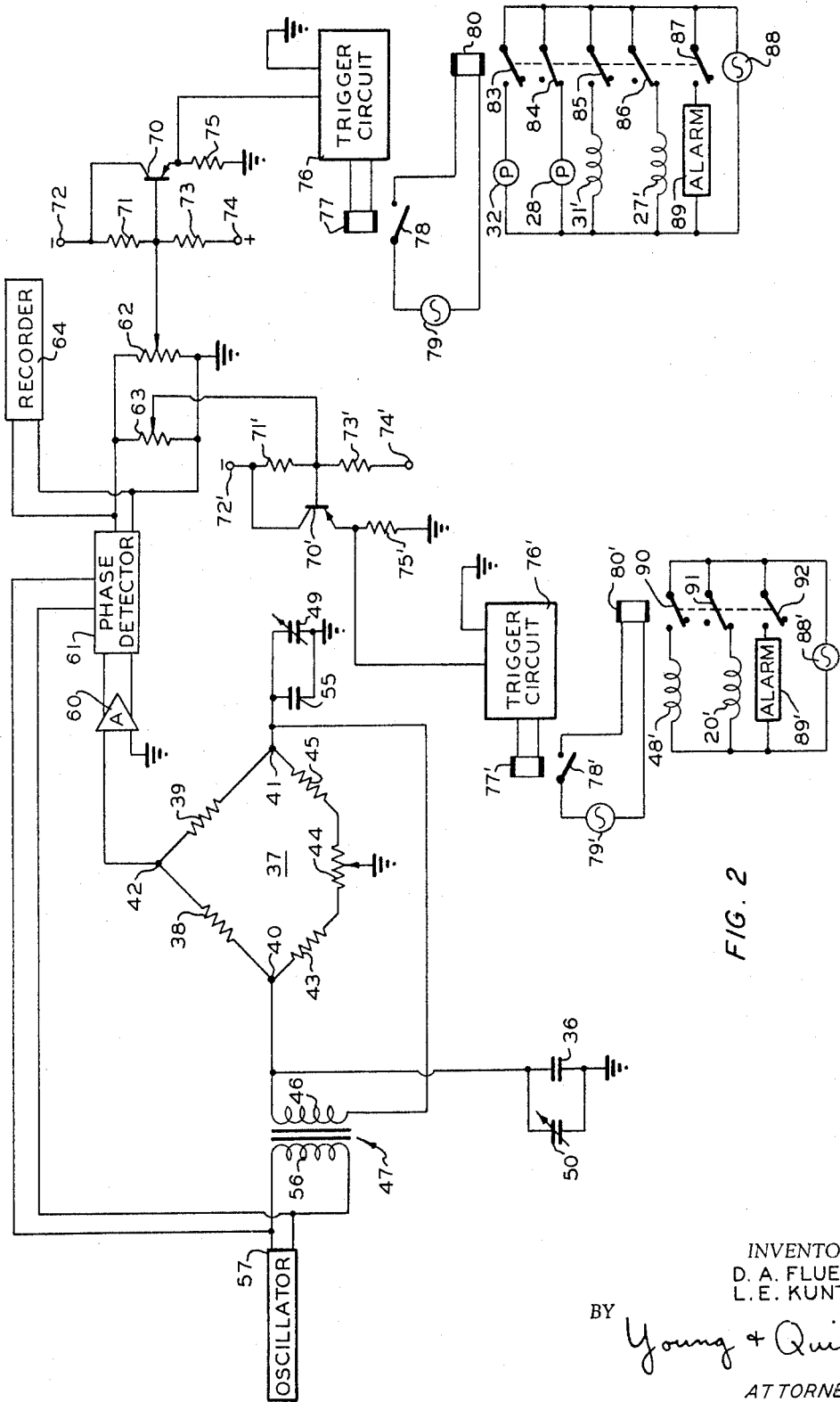
FIGURE 2 is a schematic circuit drawing of the measuring and control apparatus employed in FIGURE 1.

Monitor 24 measures the B.S. & W. concentration by measuring the dielectric constant of the oil. A capacitor 55, see FIGURE 2, is disposed within the flow of oil so that the oil forms the dielectric thereof. The capacitance of capacitor 55 is compared with the capacitance of a reference capacitor 36, which preferably has clean dry oil forming the dielectric thereof. The measuring apparatus comprises a bridge network 37 which has resistors 38 and 39 connected in series relationship between first and second opposite terminals 40 and 41. The junction between resistors 38 and 39 is designated as terminal 42. A resistor 43, a potentiometer 44 and a resistor 45 are connected in series relationship between terminals 40 and 41. The contactor of potentiometer 44 is connected to ground. The secondary winding 46 of a transformer 47 is connected across bridge terminals 40 and 41. Capacitor 55 is connected between terminal 41 and ground, and capacitor 36 is connected between terminal 40 and ground. Variable adjusting capacitors 49 and 50 are connected in parallel with respective capacitors 55 and 36.

An oscillator 57 is connected across the primary winding 56 of transformer 47. This serves to energize bridge circuit 37. Output terminal 42 of the bridge network is connected to the first input terminal of an amplifier 60. The second input of amplifier 60 is connected to ground, as is the contactor of potentiometer 44. The output of amplifier 60 is connected to the first input of a phase detector 61. The output of oscillator 57 is applied to the second input of phase detector 61. The output signal from phase detector 61 is applied across parallel connected potentiometers 62 and 63. This output signal is also applied to a recorder 64 to provide a continuous record of the B.S. & W. content of the oil circulated through conduit 23 in FIGURE 1.

If bridge network 37 is balanced, there is a zero potential difference between terminal 42 and the grounded contactor of potentiometer 44. However, any unbalance of the bridge due to a change in capacitance of element 55 results in the potential at terminal 42 changing from ground potential. Also, any unbalance in the resistance arm including resistor 43, potentiometer 44 and resistor 45 or any change in the loss factor of the material in capacitor 55 results in the potential at terminal 42 changing from ground potential. Any unbalance signal from the bridge network is amplified and applied to phase detector 61. Such an unbalance signal appears as a D.C. voltage across potentiometers 62 and 63. Bridge network 37 is balanced initially by varying one or both of capacitors 49 and 50 and/or potentiometer 44 until the recorder reads zero when a reference material is disposed between the plates of capacitor 55.

The contactor of potentiometer 62 is connected to the base of a transistor 70. The base of transistor 70 is connected by a resistor 71 to a negative potential terminal 72 and by a resistor 73 to a positive potential terminal 74. The collector of transistor 70 is connected directly to terminal 72. The emitter of transistor 70 is connected to ground through a resistor 75. The emitter of transistor 70 is also connected to the first input terminal of a trigger circuit 76, the second input terminal of which is connected to ground. The output of trigger circuit 76 is connected to a relay coil 77.

The circuit thus far described is calibrated so that an increase in the B.S. & W. of the sample in conduit 23 above a preselected value establishes a voltage at the contactor of potentiometer 62 of sufficient magnitude to cause conduction through transistor 70. This results in a pulse being applied to the input of trigger circuit 76, the output of which energizes relay coil 77.

When relay coil 77 is energized, a switch 78 is closed to connect a current source 79 to a relay coil 80. Relay coil 80 actuates switches 83 to 87. Switches 83 to 87 serve to connect a current source 88 in circuit with pump 32, pump 28, solenoid 31', solenoid 27' and alarm 89, respectively. Solenoids 31' and 27' open respective valves 31 and 27 when energized. As long as the B.S. & W. content of the measured oil is less than a preselected value, relay coils 77 and 80 remain deenergized so that pump 28 is actuated and valve 27 is open. This transfers oil to pipeline 26 of FIGURE 1. When the measured B.S. & W. content exceeds this preselected value, relay coil 80 is energized to actuate the associated switches. This deenergizes pump 28 and closes valve 27 to terminate flow of oil to pipeline 26. At the same time, pump 32 is energized and valve 31 is opened to return the oil from surge tank 22 to column 11 and treater 12 to reduce the B.S. & W. content of the oil. At the same time, alarm 89 is energized to notify an operator or to provide a record of the increased B.S. & W. content.

A network similar to the one thus far described is associated with potentiometer 63, and corresponding elements are designated by like primed reference numerals. However, trigger circuit 76' is designed such that relay coil 77' is energized when the B.S. & W. content of the oil becomes less than a second preselected value. When this occurs, relay coil 80' is energized to actuate switches 90 to 92. Switches 90 to 92 connect current source 88' in circuit with solenoid 48', solenoid 20' and alarm 89', respectively. As long as the B.S. & W. content of the oil exceeds the second preselected value, solenoid 20' is energized to retain valve 20 in FIGURE 1 open. Valve 48 remains closed at this time. If the B.S. & W. content of the oil falls below this second preselected value, relay coil 80' is energized to energize solenoid 48' and alarm 89'. This opens valve 48 and closes valve 20 so that the input crude oil bypasses the treater and is supplied directly to surge tank 22. This flow continues as long as the B.S. & W. content remains less than the second preselected value. Of course, other types of flow regulation equipment can be employed. For example, a single pump can be employed in conduit 23 to direct oil either to conduit 26 or conduit 20. Similarly, a three-way valve can replace valves 27 and 31. Furthermore, part of the oil can be recycled or passed around the treater at times to keep the B.S. & W. content within the desired range.

Figure 3:
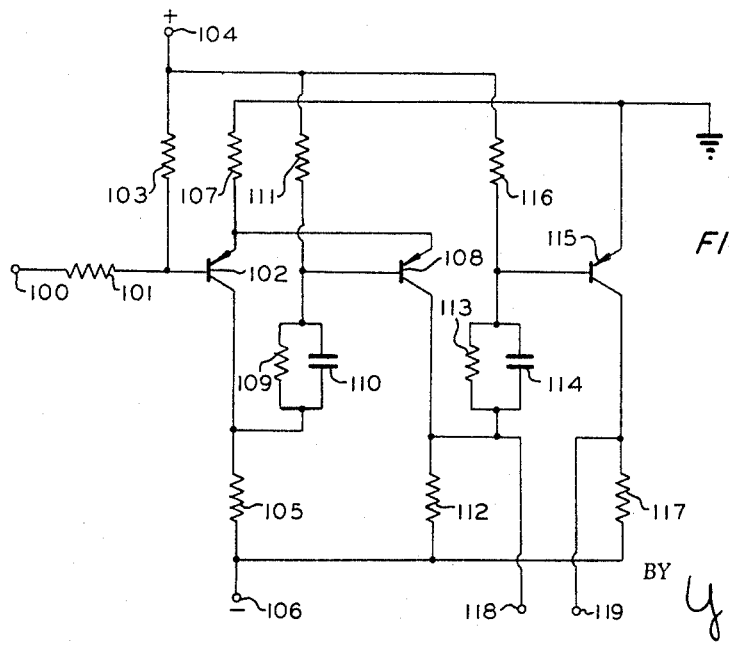
FIGURE 3 is a schematic circuit drawing of a trigger circuit which can be employed in the circuit of FIGURE 2.

A suitable trigger circuit for use in the apparatus of FIGURE 2 is illustrated schematically in FIGURE 3. Input terminal 100 is connected by means of a resistor 101 to the base of a transistor 102. The base of transistor 102 is connected by a resistor 103 to a positive potential terminal 104. The emitter of transistor 102 is connected by a resistor 107 to ground, and the collector of transistor 102 is connected by a resistor 105 to a negative potential terminal 106. The collector of transistor 102 is also connected by series-connected resistors 109 and 111 to terminal 104. A capacitor 110 is connected in parallel with resistor 109.

The emitter of transistor 102 is connected directly to the emitter of a second transistor 108. The junction between resistors 109 and 111 is connected to the base of transistor 108. The collector of transistor 108 is connected by a resistor 112 to terminal 106. The collector of transistor 108 is also connected by series connected resistors 113 and 116 to terminal 104. A capacitor 114 is connected in parallel with resistor 113. The junction between resistors 113 and 116 is connected to the base of a transistor 115. The emitter of transistor 115 is connected directly to ground, and the collector is connected by a resistor 117 to terminal 106. Ouput terminals 118 and 119 are connected to the collectors of respective transistors 108 to 115.

The circuit of FIGURE 3 forms a Schmitt trigger circuit. As is well known, a trigger circuit of this type has two stable states of operation, depending upon the amplitude of the input signal. When the input signal exceeds a preselected voltage, transistor 115 conducts to provide an output signal between terminal 119 and ground. This constitutes the output signal of trigger circuit 76 when the B.S. & W. content of the measured oil exceeds the first preselected value. When the input signal to the trigger circuit is less than the second preselected value, an output signal appears between terminal 118 and ground. Such a signal provides the input to relay coil 77' of FIGURE 2. It should thus be apparent that two circuits of the type illustrated in FIGURE 3 can be employed for the respective circuits of FIGURE 2. However, transistor 115 and its associated circuit elements is not needed in circuit 76'.

While the invention has been described in conjunction with a presently preferred embodiment, it should be evident that it is not limited thereto.

What is claimed is:

1. An oil transfer system comprising a source to supply oil, treating means to remove B.S. & W. from oil, said treating means having an inlet and a outlet, a receptacle to receive oil, first conduit means to convey oil from said source to the inlet of said treating means, second conduit means to convey oil from the outlet of said treating means to said receptacle, third conduit means to convey oil from the outlet of said treating means to the inlet thereof, fourth conduit means to convey oil from the inlet of said treating means to the outlet thereof, means connected to said second conduit means to measure the B.S. & W. content of the oil in said second conduit means, and means responsive to said means to measure to (1) pass oil through said first and second conduit means when the measured B.S. & W. content is in a predetermined range, (2) pass oil through said third conduit means when the measured B.S. & W. content exceeds said predetermined range and (3) pass oil through said fourth and second conduit means when the measured B.S. & W. content is below said predetermined range.

2. The system of claim 1 wherein said means to measure comprises a capacitor disposed so that oil in said second conduit means forms the dielectric thereof, and means to measure changes in capacitance of said capacitor.

3. The system of claim 1 wherein said means to measure comprises means to establish a first voltage representative of the B.S. & W. content of the oil in said second conduit means, a voltage dividing network, means applying said first voltage across said network, a trigger circuit adapted to provide an output signal when an input voltage applied thereto is a preselected value, ad means connecting the input of said trigger circuit to said network so that a preselected fraction of said first voltage is applied as an input voltage to said trigger circuit.

4. The apparatus of claim 3 wherein said means connecting includes pulse shaping means to transmit a pulse to the input of said trigger circuit when said first voltage reaches a preselected value.

5. An oil transfer system comprising a source to supply oil, treating means to remove B.S. & W. from oil, said treating means having an inlet and an outlet, a receptacle to receive oil, means to pass oil from said source to the inlet of said treating means, means to measure the B.S. & W. content of treated oil removed from said treating means, and means responsive to said means to measure to (1) pass oil from said source to the inlet of said treating means and from the outlet of said treating means to said receptacle when the measured B.S. & W. content is within a predetermined range, (2) recycle oil from the outlet to the inlet of said treating means when the measured B.S. & W. content is above said predetermined range and (3) bypass at least a part of the oil from said source around said treater to supply same directly to said receptacle when the measured B.S. & W. content of the oil is below said predetermined range.

6. The method of obtaining oil having a B.S. & W. content in a predetermined range which comprises passing oil from a source through a treating zone to a receptacle, said treating zone having an inlet and an outlet, measuring the B.S. & W. content of the treated oil, recycling oil from the outlet to the inlet of said treater when the measured B.S. & W. content of the treated oil exceeds a predetermined range, and passing at least a part of the oil from said source around said treater to said receptacle when the measured B.S. & W. content of the treated oil is below said predetermined range.

References Cited by the Examiner

UNITED STATES PATENTS

| | | | |
|---|---|---|---|
| 2,773,556 | 12/1956 | Meyers | 210—96 X |
| 2,940,593 | 6/1960 | Remke | 210—96 X |
| 2,995,139 | 8/1961 | Remke | 137—2 |
| 3,005,554 | 10/1961 | Kuntz | 210—96 |
| 3,060,950 | 10/1962 | Hjmans | 137—110 X |
| 3,069,558 | 12/1962 | Burt et al. | 307—88.5 |
| 3,117,238 | 1/1964 | McNair | 307—88.5 |

WILLIAM F. O'DEA, *Primary Examiner.*

D. ZOBKIW, *Assistant Examiner.*